United States Patent [19]

Orts

[11] 4,013,869
[45] Mar. 22, 1977

[54] TORTILLA WARMER AND HYDRATER

[76] Inventor: Maria Amelia Orts, 221 Buena Vista, San Antonio, Tex. 78207

[22] Filed: Apr. 12, 1976

[21] Appl. No.: 676,298

[52] U.S. Cl. .............................. 219/401; 99/415; 99/467; 99/483; 126/369; 219/386; 219/432; 219/433; 219/441; 426/505

[51] Int. Cl.[2] ........................................ F27D 11/02

[58] Field of Search .......... 219/365, 385, 386, 387, 219/401, 430, 432, 433, 438, 439, 441, 442, 527, 528; 68/5; 99/341, 415, 467, 483; 426/74, 420, 505, 510, 511, 646; 126/348, 369

[56] References Cited

UNITED STATES PATENTS

| 1,624,989 | 4/1927 | Smith et al. ................. 219/433 X |
| 1,653,901 | 12/1927 | Haessly ............................ 128/256 |
| 2,441,941 | 5/1948 | Shafter ............................ 219/433 |
| 2,443,321 | 6/1948 | Miner, Jr. ............................ 68/5 |
| 2,448,388 | 8/1948 | Plummer ............................ 219/433 |
| 2,818,794 | 1/1958 | Aslesen ........................ 219/401 X |
| 2,850,616 | 9/1958 | Hatch ............................... 219/433 |
| 3,030,486 | 4/1962 | Lashley ......................... 219/401 X |
| 3,208,854 | 9/1965 | Hediger et al. ...................... 427/77 |
| 3,859,505 | 1/1975 | Herbrand ........................ 219/433 |
| 3,869,595 | 3/1975 | Collins et al. .................... 219/387 |

Primary Examiner—Volodymyr Y. Mayewsky
Attorney, Agent, or Firm—Cox, Smith, Smith, Hale & Guenther Incorporated

[57] ABSTRACT

The present invention is a device for warming and hydrating tortillas that have been cooked at an earlier time and have subsequently become cold and hard. A base for the device has a heating element with a thermostat control. A cylindrical container is located above the heating element. Inside of the cylindrical container is a rack held a predetermined distance above the bottom of the cylindrical container by downwardly extending legs. A lid closes the top of the cylindrical container.

4 Claims, 1 Drawing Figure

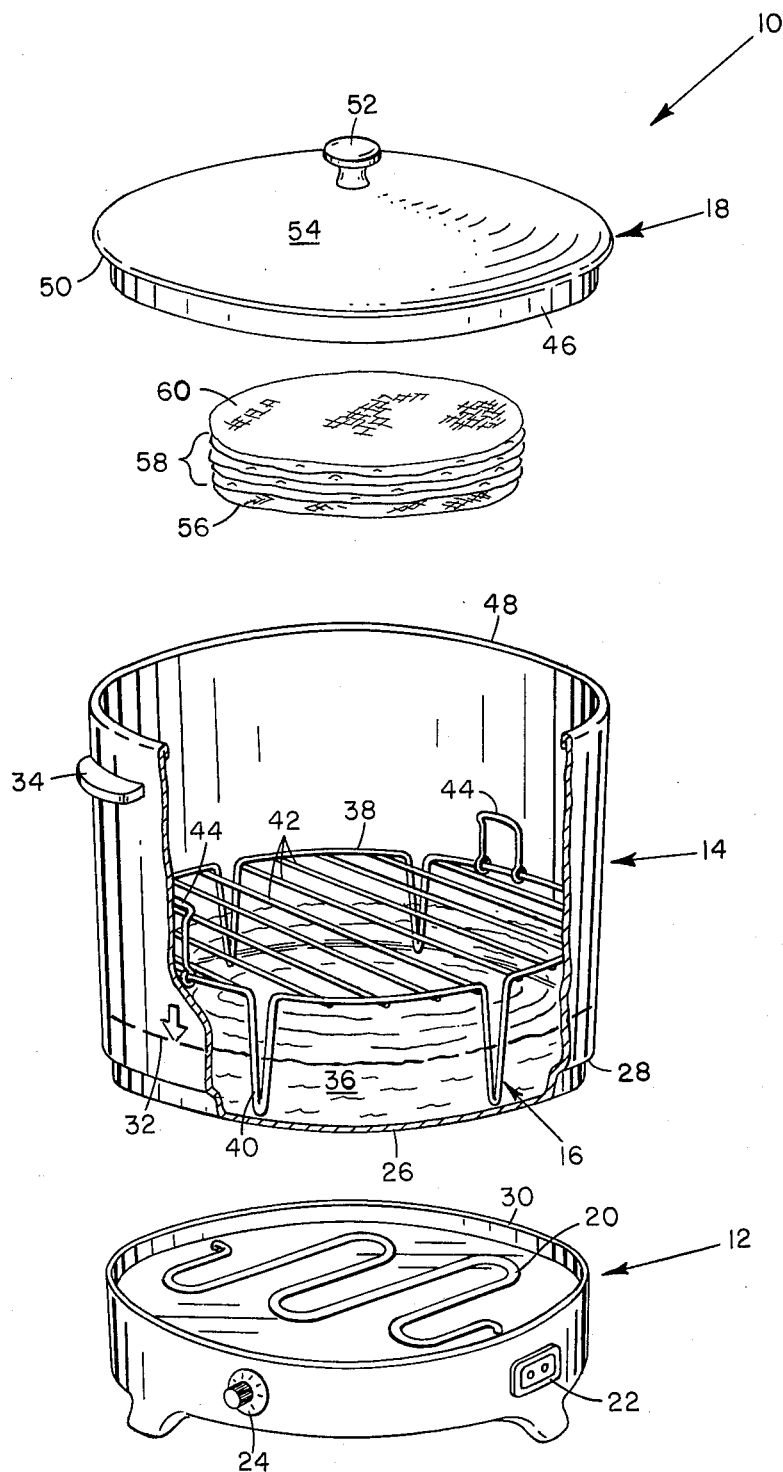
FIG.

4,013,869

TORTILLA WARMER AND HYDRATER

BACKGROUND OF THE INVENTION

This invention relates to a tortilla warmer and hydrater and, more particularly, to a device that will warm and hydrate cold, dry tortillas cooked at an earlier time, which tortillas have become hard.

BRIEF DESCRIPTION OF THE PRIOR ART

Prior to the present invention, if an individual wanted to warm a tortilla that had been leftover from an earlier meal, the tortilla would simply be placed in an oven. Upon warming the tortilla, it would be very hard and brittle, which is very unappetizing for most uses. If the tortilla has become hard, another method that has been used is to simply refry the tortilla.

Because of the problems encountered when serving tortillas that are not freshly cooked, most people simply prepare enough tortillas to last for a single meal. Tortillas for subsequent meals are prepared and cooked immediately before the particular meals. This insures that the tortilla will be fresh upon serving. However, by using the present invention, a large number of tortillas may be prepared at one time and served at several subsequent meals over a subsequent period of time simply by warming the tortillas in the present device.

SUMMARY OF THE INVENTION

It is an object of the present invention to provide a tortilla warmer and hydrater.

It is another object of the present invention to provide a device wherein a dry, hard, cold tortilla may be inserted for warming and hydrating. The device consists basically of a lower heating unit with a cylindrical pot being located thereabove. In the cylindrical pot is located a wire rack mounted on downwardly extending legs. Below the wire rack, water is normally located inside the cylindrical pot. A cloth pad will rest upon the wire rack and tortillas will be stacked on the cloth pad. Another cloth pad will be placed on the top of the tortillas. Then a tight cover is placed on top of the cylindrical pot forming a fairly tight steaming device.

BRIEF DESCRIPTION OF THE DRAWINGS

The FIGURE is an exploded perspective view of the tortilla warmer and hydrater with the cylindrical pot being partially sectioned to show the inside thereof.

DESCRIPTION OF THE PREFERRED EMBODIMENT

Referring to the drawing in conjunction with the following detailed description, there is shown a tortilla warmer and hydrater represented generally by reference numeral 10. The tortilla warmer and hydrater 10 consists of a base 12, cylindrical pot 14, rack 16 and top 18.

The base, which may be of any conventional type, has been shown in this preferred embodiment as an electrical type having a resistive heating element 20. The resistive heating element 20 receives power through electrical connection 22. The amount of current flowing through the resistive heating element 20 is controlled by thermostat 24, which in turn controls the heat given off by resistive heating element 20.

The cylindrical pot 14 is particularly designed to fit the base 12. Near the bottom 26 of cylindrical pot 14 is located a shoulder 28 that will rest against the rim 30 of the base 12. Upon placing the cylindrical pot 14 into position, the shoulder 28 resting on the rim 30 will hold the bottom 26 just above the resistive heating element 20. This will allow maximum heat transfer to the cylindrical pot 14.

The cylindrical pot 14 also has a water level indicator 32 which may be formed by indentations in the side of the cylindrical pot 14. Handles 34 are attached to the sides of the cylindrical pot 14 for ease of movement without the danger of burning a person's hands.

Inside the cylindrical pot 14, water is filled to the water level indicator 32. The water is represented generally by reference numeral 36. Above the water level indicator 32 is the rack 16 that has a circular support frame 38. The circular support frame 38 has downwardly extending projections 40 to form legs therefor. The legs 40 extend into the water 36 and rest against the bottom 26 of cylindrical pot 14. Horizontal support bars 42 are located in a plane substantially parallel to the bottom 26 and above the water level indicator 32. The horizontal support bars 40 connect to the sides of circular support frame 38 by any convenient means, such as welding. It should be realized that the horizontal support bars 42 are simply one illustrative method of forming a rack on which tortillas may be suspended above water 36. Also, handles 44 are connected to the cylindrical support frame 38 for removing the rack 16 from the cylindrical pot 14.

The top 18, which is circular in design, has a downwardly extending flange 46 that fits just inside of the upper rim 48 of the cylindrical pot 14. A shoulder 50 rests against the upper rim 48 to form a relatively good seal therewith. A knob 52 is located in the top center of the cover portion 54 for ease of removal of the top 18.

To use the tortilla warmer and hydrater 10 as shown in the FIGURE, the cylindrical pot 14 is filled with water 36 to the water level indicator 32. The rack 16 is then placed inside of the cylindrical pot 14 as shown, and the cylindrical pot 14 is placed on the base 12. The base 12 is connected to a suitable electrical outlet via electrical connection 22. The thermostat 24 is set for the proper temperature to bring the water 36 to a simmer. A cloth pad 56 is placed inside of cylindrical pot 14 on rack 16. Thereafter, tortillas 58 are placed on the cloth pad 56. Another cloth pad 60 is placed above the tortillas 58. Next, the top 18 is placed securely into position and the thermostat 24 is adjusted to bring the water 36 to a boil. The steam created by the boiling water 36 will fill the space inside of cylindrical pot 14 and will be absorbed by the tortillas 58. The cloth pads 56 and 60 insure that the tortillas 58 do not stick to the rack 16, and aid in the holding of moisture inside of the tortillas 58. As many tortillas 58 as can be conveniently held in cylindrical pot 14 may be warmed and hydrated at the same time.

By using the previously described tortilla warmer and hydrater, tortillas that have become hard may be placed inside of the cylindrical pot 14 between the cloth pads 56 and 60 in a manner as previously described, and subsequently heated. The moisture generated by steam from water 36 will be absorbed by the tortillas thereby giving them a fresh cooked taste that is pleasing to the appetite.

I claim:

1. An apparatus adapted for warming and hydrating cold, dry tortillas, said apparatus comprising:
   base means having a resistive heating element located therein, said resistive heating element being adapted for connection to a source of electric power;

cylindrical container means located on said base means, said cylindrical container means having an upper opening and being adapted for receiving water therein;

rack means insertable through said upper opening, said rack means being suspended at a predetermined horizontal plane above a bottom of said container, said rack means allowing free fluid flow therethrough;

an upper cloth pad and a lower cloth pad located on said rack means and being adapted for receiving said tortillas to be warmed and hydrated therebetween cover means for covering said opening of said container means;

thermostat means connected to said resistive heating element, said thermostat means controlling current flow through said resistive heating element to maintain temperature of water in said cylindrical container means at a predetermined level to produce steam and heat said tortillas.

2. The apparatus as recited in claim 1 wherein said rack means includes a substantially circular wire frame having downward extensions to form legs therefor, horizontal support means connecting to opposing sides of said circular wire frame, said horizontal support means being used to support said tortillas thereabove.

3. The apparatus as recited in claim 2 wherein said cylindrical container means includes a reduced diameter lower portion to form a lower shoulder, said lower shoulder resting against an upper rim of said base means to suspend said cylindrical container means above said resistive heating element.

4. The apparatus as recited in claim 3 wherein said cylindrical container having first handle means on the side thereof, said cover means having second handle means on top thereof, and rack means having a third handle means connected to said circular wire frame.

* * * * *